Dec. 1, 1936.  A. L. FREEDLANDER  2,062,568
COG BELT
Filed July 9, 1934
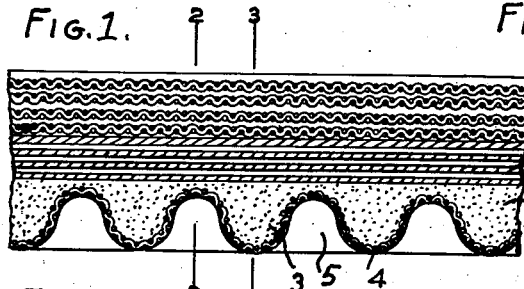
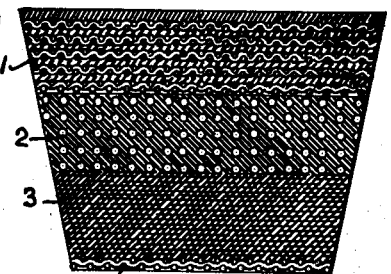
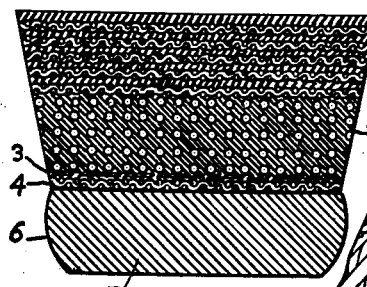
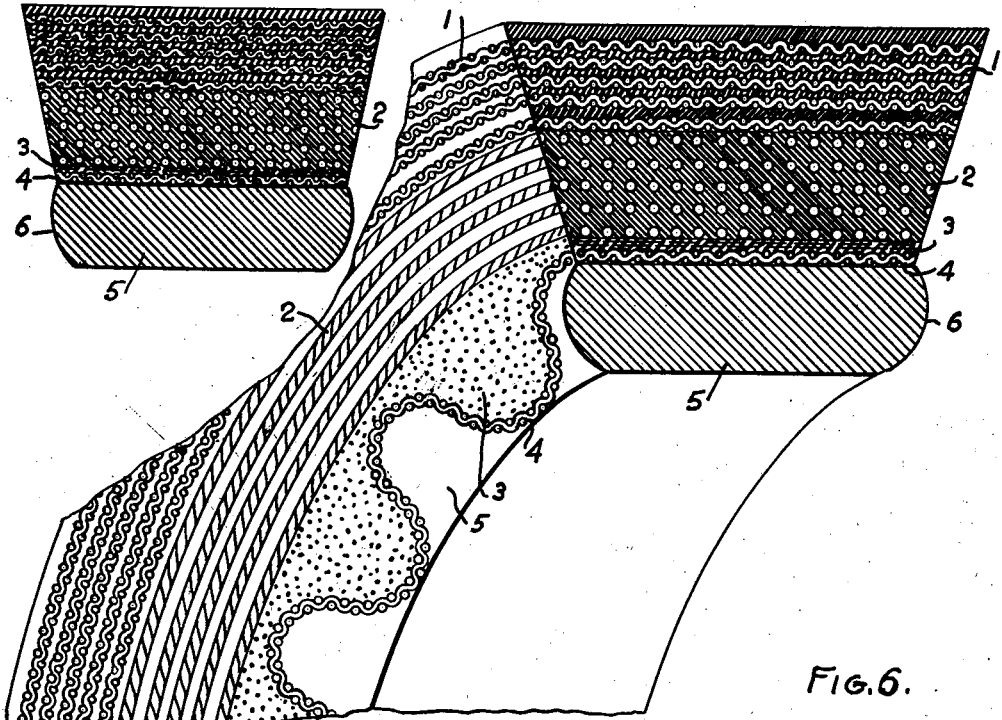
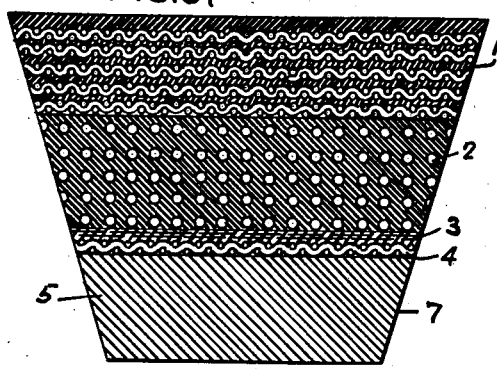
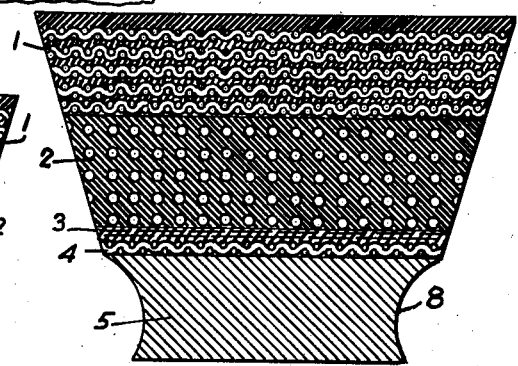
Inventor
ABRAHAM L. FREEDLANDER,
BY Toulmin & Toulmin
Attorneys Patented Dec. 1, 1936

2,062,568

UNITED STATES PATENT OFFICE 2,062,568

COG BELT

Abraham L. Freedlander, Dayton, Ohio, assignor to The Dayton Rubber Manufacturing Company, Dayton, Ohio, a corporation of Ohio Application July 9, 1934, Serial No. 734,266

7 Claims. (Cl. 74—233)

This invention relates to improvements in belts, and has for its object to form from a V-shaped belt a fully trapezoidal belt in which the spaces between the teeth are filled with some flexible composition, either rubber, synthetic rubber or other suitable composition.

It is an object of this invention to fill in the spaces between the teeth of a V-shaped toothed belt with a flexible material that will wear off when the belt passes about a pulley so that these filled-in parts may assume in operation two relationships to the body of the belt, one in which the surfaces of the filled-in parts are flush with the surfaces of the belt, and the other in which the surfaces of the filled-in parts are concave.

It is also an object to provide an improved cog V-belt that has better tractive surfaces and noise-reducing qualities.

It is my object to place a resilient compound with or without reenforcement between the teeth of a trapezoid cog toothed belt. When this belt is bent around a pulley the material between the teeth will be pressed outwardly, forming bulged portions between the teeth. After a short period, this projecting material being softer than the rest of the belt, will wear away, presenting a firm, flat surface, thus providing for an increased traction area and forming a yielding surface which reduces noise. After this wearing away has taken place, when the belt is straightened out there will be concave areas between the teeth and the side walls of the belt.

Referring to the drawing:

Figure 1 is a longitudinal section through a part of the belt.

Figure 2 is a section on the line 2—2 of Figure 1, showing the condition of a filled-in part as the belt passes about a pulley.

Figure 3 is a section on the line 3—3 of Figure 1.

Figure 4 shows in elevation part of the belt and the condition of the filled-in part while the belt is passing about a pulley.

Figure 5 shows a section of the belt as it passes about a pulley, with the filled-in part worn so that the surfaces are flush with the surfaces of the belt.

Figure 6 is the section shown in Figure 5 but with the belt in repose and the filled-in part having surfaces that are concave.

The present belt is made by inserting a flexible composition of either rubber, synthetic rubber or other suitable flexible material in between the teeth of a toothed belt. When the belt is bent around the pulley the flexible filled-in portions bulge outwardly and press against the sides of the V-shaped grooves in the pulleys with great pressure. This pressure creates a rubbing action which soon wears off the bulged parts of the belt so that the filled-in parts of the belt will have surfaces flush with the sides of the belt, as shown in Figure 5, or in which the surfaces of the filled-in parts are concave, as shown in Figure 6.

In the present embodiment the V-shaped cog belt consists of outer layers of fabric 1, an intermediate layer of cord 2, an inner layer 3 of rubber having embedded therein fibers and designated as "Stiflex", which constitute the toothed part of the belt. The teeth are covered by a fabric layer 4. The numeral 3 may be considered as representing the teeth of the belt, as well as the "Stiflex" layer. The spaces between the teeth are filled with a composition 5. Under normal conditions the surfaces of the material used for filling in the spaces between the teeth are flush with the surfaces of the body of the belt, but when the belt passes about a pulley the lateral edges of each filled-in part bulge out, as indicated by the numeral 6. The belt as a whole may be considered as being made up of two parts, one including the fabric layer and the cord layer; the other the fiberized rubber, the fabric 4 and the composition filling in the spaces between the teeth.

After the belt has been used for a few hours or at most a few days, the bulged-out parts become worn off so that the acquired surfaces 7 of the filled-in parts, as the belt passes about a pulley, become in alignment with the lateral surfaces of the belt, as shown in Figure 6. After these filled-in parts have become worn they assume in repose the concave shape 8 shown in Figure 6. A belt constructed with these flexible, soft filled-in parts gives better tractive surfaces and cuts down noise.

It will be understood that I desire to comprehend within my invention such modifications as come within the scope of my claims and my invention.

Having thus fully described my invention, what I claim as new and desire to secure by Letters Patent, is:

1. As an article of manufacture, a belt of general trapezoidal section having a tension section and a compression section, said compression section being made up of teeth having sections of softer material interposed therebetween, said interposed sections having their sides reduced so as to be concave when the belt is flat and flush with the sides of the teeth when the belt is bent.

2. As an article of manufacture, a belt of general trapezoidal section having a tension section and a compression section, said compression section being made up of teeth having interposed therebetween sections of softer material of such shape as to have concave side surfaces when the belt is flat, and flat side surfaces co-extensive with the side surfaces of the teeth when the belt is bent.

3. As an article of manufacture, a belt of general trapezoidal section having a tension section and a compression section, said compression section being made up of teeth having interposed therebetween sections of softer material of such shape as to present concave side surfaces in the straight run of the belt and straight side surfaces co-extensive with the side surfaces of the teeth in the bent portion of the belt, respectively, when the belt is trained about a drive pulley and a driven pulley.

4. As an article of manufacture, a belt having a plurality of straight-sided teeth on one side thereof, said teeth having interposed therebetween sections of softer material of such shape as to have concave side surfaces when the belt is flat and flat side surfaces co-extensive with the side surfaces of the teeth when the belt is bent.

5. As an article of manufacture, a belt having a plurality of straight-sided teeth on one side thereof, said teeth having interposed therebetween sections of softer material of such shape as to present concave side surfaces in the straight run of the belt and straight side surfaces co-extensive with the side surfaces of the teeth in the bent portion of the belt, respectively, when the belt is trained about drive and driven pulleys.

6. As an article of manufacture, a fabricated belt of plural straight-sided teeth on one side thereof having interposed therebetween sections of softer material with concave sides and of such shape that, during the operation of the belt about a closed path, the sides of the sections may extend outward so far as, but no farther than, the sides of the teeth in the bent portion of the belt.

7. In a cog belt having spaced teeth on one surface thereof, sections of softer material interposed between the teeth with concave sides and of such shape that, during the bending of the belt in operation, such sections expand so far as, but no farther than, the sides of the teeth in the bent portion of the belt.

ABRAHAM L. FREEDLANDER.